(12) United States Patent
Taylor

(10) Patent No.: US 6,640,941 B2
(45) Date of Patent: Nov. 4, 2003

(54) SHOCK-ISOLATION STRUCTURE

(75) Inventor: Douglas P. Taylor, North Tonawanda, NY (US)

(73) Assignee: Tayco Developments, Inc., North Tonawanda, NY (US)

( * ) Notice: Subject to any disclaimer, the term of this patent is extended or adjusted under 35 U.S.C. 154(b) by 0 days.

(21) Appl. No.: 10/003,502

(22) Filed: Oct. 23, 2001

(65) Prior Publication Data

US 2003/0075407 A1 Apr. 24, 2003

(51) Int. Cl.[7] .................................................. F16F 9/00
(52) U.S. Cl. .................... 188/314; 188/380; 188/322.19
(58) Field of Search ................................ 188/380, 379, 188/322.19, 300, 297, 313, 314; 267/136, 150; 248/575, 576, 581, 603, 604

(56) References Cited

U.S. PATENT DOCUMENTS

| | | | |
|---|---|---|---|
| 3,228,492 A | * | 1/1966 | Blumrich .................... 188/377 |
| 3,592,422 A | | 7/1971 | Norman |
| 4,310,149 A | * | 1/1982 | Camilleri .................... 267/136 |
| 4,892,051 A | | 1/1990 | Taylor et al. |
| 5,449,155 A | * | 9/1995 | Mack .......................... 267/292 |
| 5,727,663 A | | 3/1998 | Taylor |

* cited by examiner

Primary Examiner—Jack Lavinder
Assistant Examiner—Thomas Williams
(74) Attorney, Agent, or Firm—Joseph P. Gastel

(57) ABSTRACT

A shock-isolation structure for supporting a relatively light load on a supporting surface and having a plurality of spring units operable in both tension and compression oriented in a truss configuration with first ends of said spring units connected to the supporting surface for universal movement and with second ends of said spring units connected to the load for universal movement, with each of the spring units including a coil spring, an end cap, and a rod which extends outwardly through the end cap with a clearance fit in a nonextended position, a clevis body on the end of each of the rods, a groove in each of the end caps, and a ridge on each of the clevis bodies for mating engagement when the rod is in the nonextended position to thereby center each of the rods in each of the end caps.

31 Claims, 4 Drawing Sheets

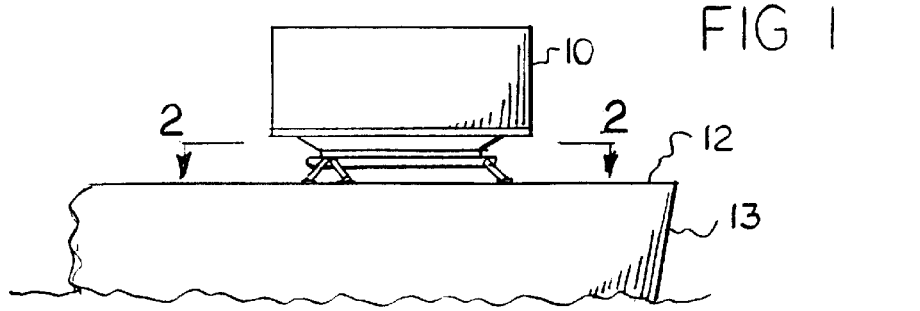
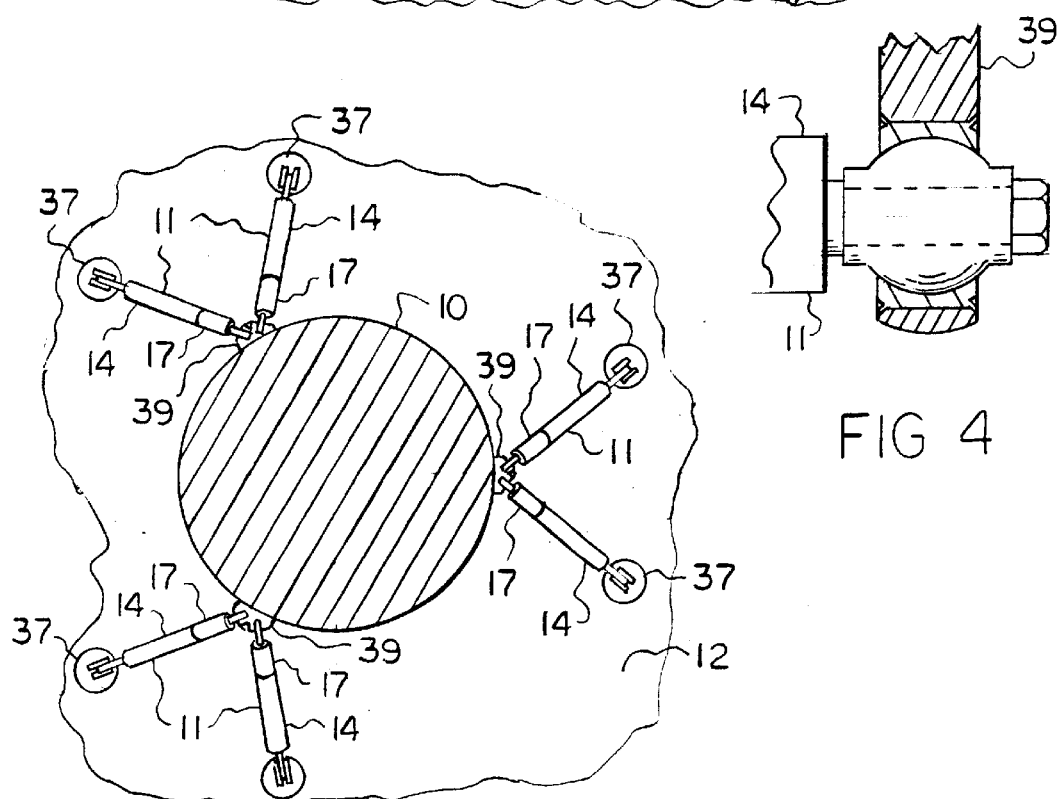
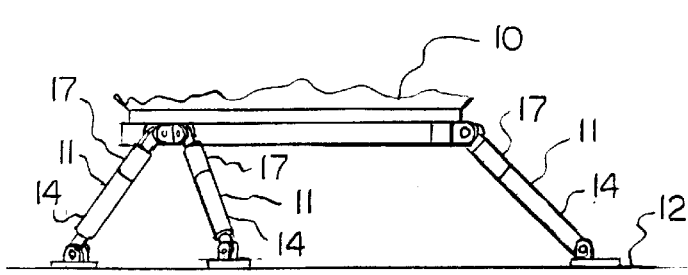
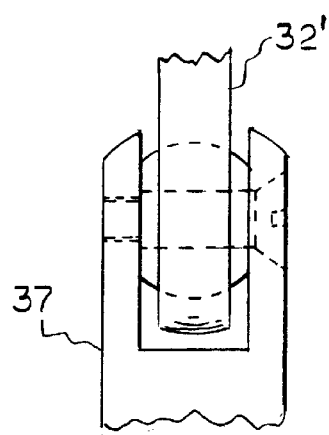
FIG 1
FIG 2
FIG 3
FIG 4
FIG 5

SHOCK-ISOLATION STRUCTURE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to a shock-isolation structure for mounting a relatively light device on a support which can be subjected to high shock forces.

A shock-isolation system of the present type is known in the art, and is shown in U.S. Pat. No. 4,892,051. However, the shock-isolation system shown in this patent is for mounting a relatively heavy device, and to this end, its tension-compression units utilize liquid springs. In addition, the shaft within the liquid spring is in tight sealing engagement with its supporting structure which produces friction therebetween. However, this friction can be tolerated because it is still a relatively small proportion of the spring force. However, liquid springs operable in tension and compression cannot be used when the device which is being carried by the shock-isolation structure is of relatively light weight, possibly on the order of about ten pounds, because the liquid springs will act as rigid links and will not be actuated into their tension and compression modes when subjected to shocks. This is the case because the weight of the supported device is not sufficiently great to actuate the springs into their tension and compression modes when the device is subjected to large shocks. In other words, a relatively rigid shock-isolation system, such as shown in U.S. Pat. No. 4,892,051 will not operate to isolate a device if the device which is being supported is of relatively light weight. Therefore, for supporting devices of relatively light weight, the tension compression units of the shock-isolation structure cannot utilize liquid springs, but must use springs which will yield when the light device carried by the shock-isolation system is subjected to shock forces. However, when relatively light springs in the tension compression unit are used as part of the shock-isolation system, there must be a loose fit between the shafts of the tension compression units and their guiding structure. This permits the shafts to move somewhat radially in operation, and this can be tolerated when the tension compression units are actuated in tension from their at-rest midstroke positions. However, when they return to their at-rest midstroke positions, they must be in a predetermined alignment relative to their guiding structure to support the carried device in its proper position.

BRIEF SUMMARY OF THE INVENTION

It is the object of the present invention to provide a shock-isolation structure utilizing a plurality of tension compression units containing coil springs for supporting relatively light loads against shocks which would cause the device to move relative to its supporting surface and which will cause the device to return to its original position after the shock is no longer present. Other objects and attendant advantages of the present invention will readily be perceived hereafter.

The present invention relates to a shock-isolation structure wherein a load is supported on a supporting surface with a plurality of spring units operable in both tension and compression therebetween and wherein said spring units are oriented in a truss configuration with first ends of said spring units connected to said supporting surface for universal movement and with second ends of said spring units connected to said load for universal movement, the improvement wherein each of said spring units includes a coil spring, an end cap, a rod which extends outwardly through said end cap with a clearance fit in a nonextended position, a body on the end of each of said rods, a depression in one of each of said end caps and said body, and a protrusion on the other of each of said end caps and said body for mating engagement when said rod is in said nonextended position to thereby center each of said rods in each of said end caps.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 1 is a fragmentary side elevational view of the front end of a naval vessel having a shock-isolation structure mounting a device which is to be protected against severe shocks;

FIG. 2 is an enlarged fragmentary cross sectional view taken substantially along line 2—2 of FIG. 1 and showing the geometric orientation of the tension-compression type of spring units which mount the device of FIG. 1;

FIG. 3 is an enlarged fragmentary side elevational view of the tension-compression units mounting the device;

FIG. 4 is an enlarged fragmentary view, partially in cross section, showing the ball joint at the upper end of each of the tension-compression units;

FIG. 5 is an enlarged fragmentary side elevational view of the ball joint at the lower end of each of the tension-compression units;

DETAILED DESCRIPTION OF THE INVENTION

Summarizing briefly in advance, the present invention relates to a shock-isolation structure for supporting a relatively light device 10, possibly on the order of about 10 pounds, on a hexapod system consisting of a plurality of tension-compression units 11 mounted on a deck 12 of a ship 13. The tension-compression units 11 support the device 10 in such a manner that it follows the normal movements and ordinary vibrations of the ship. However, if the ship is subjected to a major shock, the tension-compression units 11 will be activated to permit the device 10 to move relative to the ship without being injured by the shock, and after the termination of the shock, the tension-compression units 11 will accurately recenter to their midstroke positions, to thereby hold their preshock midstroke alignment. The device 10 may be any type of electronic, mechanical or optical device which must be supported in the foregoing manner. Also, the device need not be restricted to being mounted on a ship but may be mounted on any type of member on which it must be supported so that it follows the normal forces to which the device is subjected but which will be permitted to be moved by its tension-compression units so that it will not be injured by excessive shock forces such as explosions, severe seismic shocks or the like.

As can be seen from FIG. 2, the tension-compression units 11 are oriented in a hexapod truss configuration containing three pairs of tension-compression units 11 with each pair oriented in an inverted V-configuration spaced 120° from an adjacent inverted V-configuration. Also, the lower ends of the tension-compression units 11 lie on a perimeter which is larger than the upper ends. However, if desired, the pairs of tension-compression units 11 can be oriented in a V-configuration.

Figure 6:
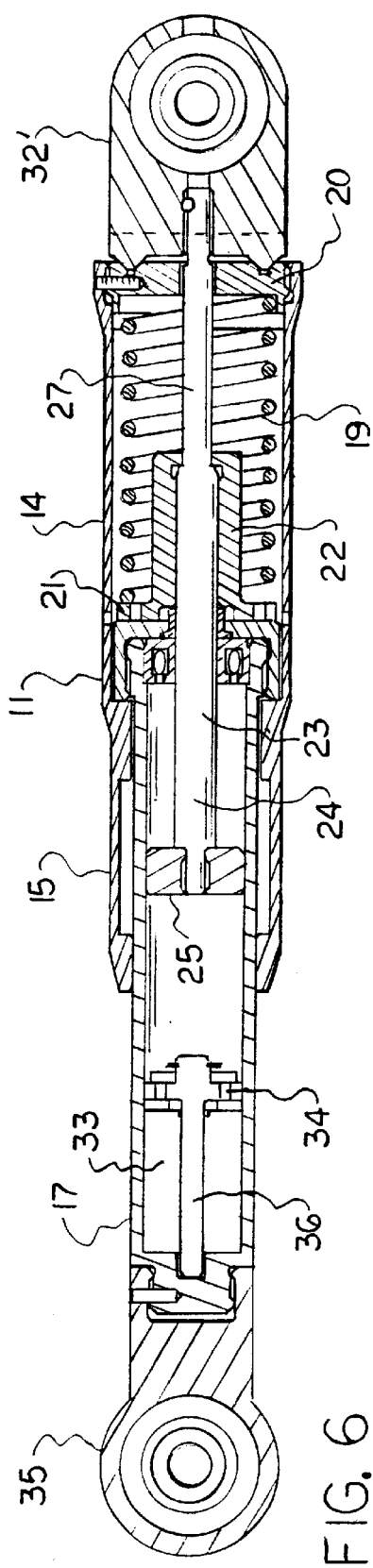
FIG. 6 is a cross sectional view of the tension-compression unit in a normal midstroke unstressed condition.

Each tension-compression unit 11 includes a sleeve 14 having an end portion 15 which is slidably mounted relative to a cylinder 17. The normal midstroke unstressed position of each tension-compression unit 11 is shown in FIG. 6, and in this position the device 10 is held so that it moves with the ship 13 irrespective of normal shocks and abrasions to which the ship is subjected. More specifically, a helical or coil spring 19 is located within sleeve 14. The right end of coil spring 19 bears against end cap 20 which is suitably retained within sleeve 14. The left end of spring 19 bears against the flared disc-like end 21 of member 22 which encircles the enlarged portion 23 of rod 24 having a fluidic head 25 suitably mounted thereon. Head 25 may be of the type described in U.S. Pat. No. 3,722,640, which is incorporated herein by reference. Rod 24 also has a reduced portion 27 and an annular shoulder 30 (FIG. 11) against which the annular end 31 (FIG. 11) of member 22 is engaged when the tension-compression unit 11 is in its normal position of FIG. 6 and its tension position of FIG. 7. The outer end of rod 23 has a ball-type clevis assembly 32' suitably mounted thereon which provides universal movement, and the smaller end 27 of rod 24 passes through a bore 32 (FIG. 11) in end cap 20 with a sufficient clearance fit so that there is no appreciable friction where the shaft moves through bore 32. The clearance fit may be on the order of a few thousandths of an inch. Cylinder 17 functions as a damper and it has suitable hydraulic fluid therein. The end of cylinder 17 includes an accumulator 33 having a wall 34 mounted at the end of rod 36 with a suitable valve arrangement mounted therein which may be identical to that shown in U.S. Pat. No. 5,727,663 which is incorporated herein by reference. A ball-type clevis assembly 35 is mounted integrally with cylinder 17 and it provides universal movement.

Each of the cylinders 11 is mounted between the device 10 and the deck 12 in a hexapod configuration as shown in FIGS. 2 and 3. The clevis assemblies 32' of tension-compression units 11 are mounted in clevis portions 37 mounted on deck 12 (FIGS. 2 and 5), and the upper portions of tension-compression units 11 are mounted in brackets 39 (FIGS. 2 and 4). Thus the opposite ends of each unit 11 is mounted for universal movement.

When the device 10 is subjected to a sufficiently large shock which causes it to move relative to the deck 12 of ship 13, the tension-compression units 11 will be activated, and some may move in tension, and some may move in compression, and some may just retain their normal position. After the shock is no longer present, the internal mechanisms of each of the tension-compression units 11 will cause them to return to their normal midstroke position of FIG. 6.

Figure 7:
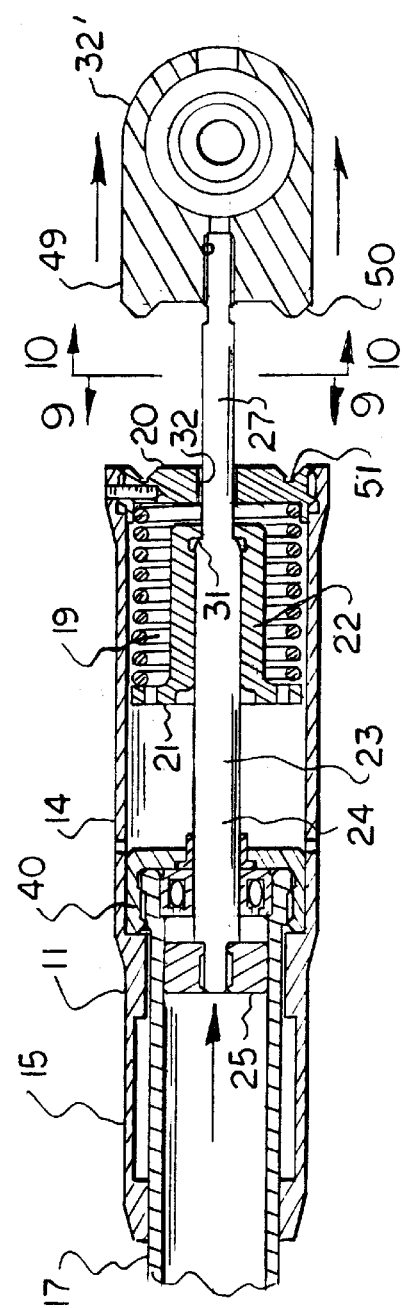
FIG. 7 is a fragmentary cross sectional view of the right end of the tension-compression unit when it is subjected to tension.

When a tension-compression unit 11 is placed in tension, the parts will move to the position of FIG. 7 wherein the small section 27 of shaft 24 is pulled out of bore 32, and the engagement between annular shoulder 30 (FIG. 11) and annular end 31 of member 22 will pull member 22 to the right (FIG. 7) from its position shown in FIG. 6, thereby compressing the spring 19. The piston head 25 will also move to the right to the position shown in FIG. 7. During the movement of shaft 24 to the right, the portion 23 of shaft 24 will move through a conventional elastomerically energized U-cup seal 26 having a compressed O-ring 28 therein, as is well known. This seal prevents leakage of hydraulic fluid from cylinder 17. The seal 26 is maintained in position because member 40 bears against one side thereof, and the other side bears against annular shoulder 36 (FIG. 12) of cylinder 17. While the unit 10 is in tension, the force of coil spring 19 on end cap 20 will maintain sleeve 14 in a position wherein the annular shoulder 43 (FIG. 11) of sleeve 14 continues to bear against the annular end 44 of member 40, which is threaded onto cylinder 17 at 45. When the tensile force is removed from tension-compression unit 11, the spring 19 will expand and the parts will return to the position shown in FIG. 6.

Figure 9:
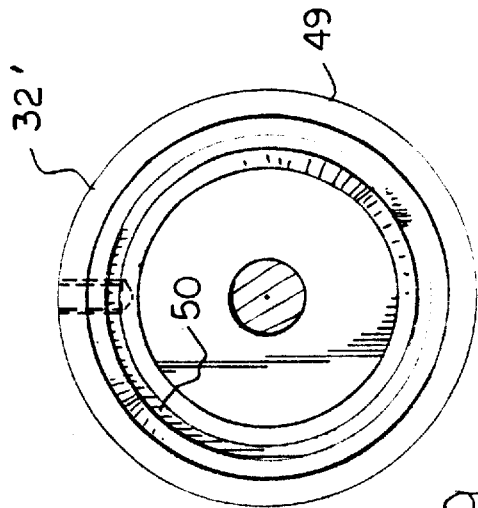
FIG. 9 is an end elevational view of the end of the cylinder of the tension-compression unit taken substantially in the direction of arrows 9—9 of FIG. 7.
Figure 10:
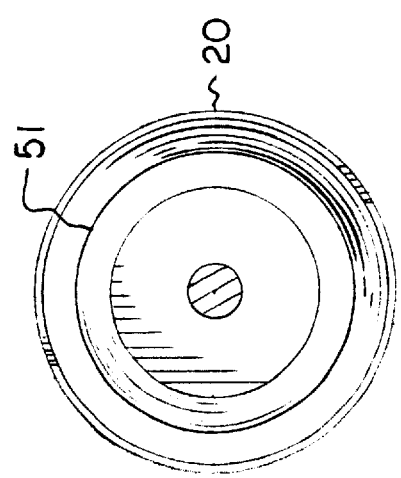
FIG. 10 is an end elevational view of the portion of the clevis assembly taken substantially in the direction of arrows 10—10 of FIG. 7.
Figure 11:
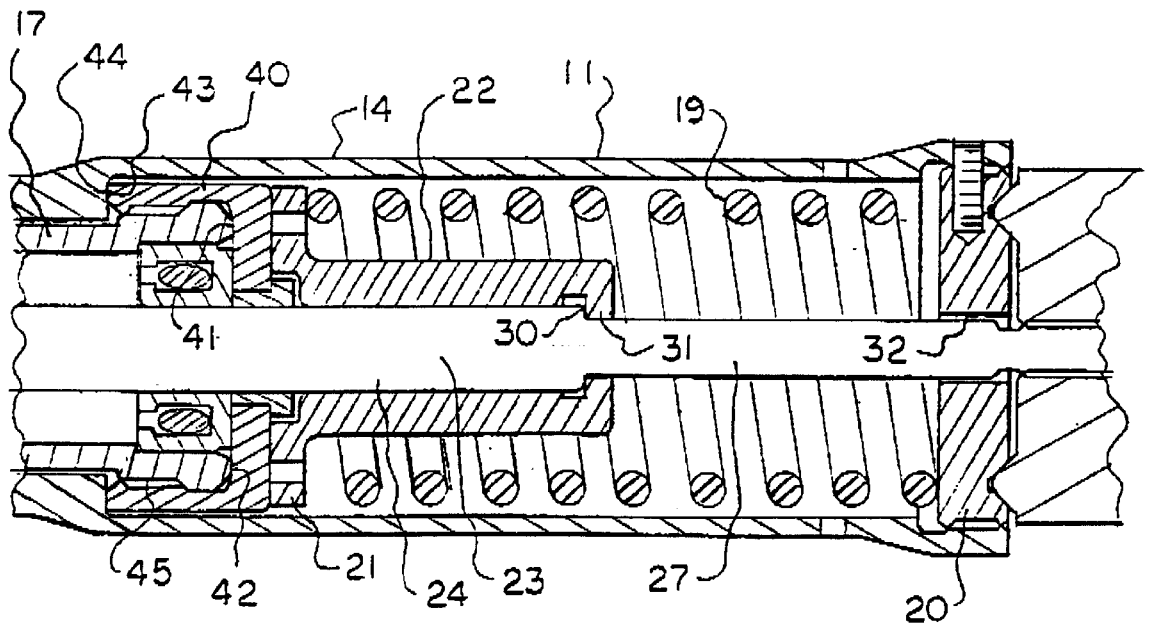
FIG. 11 is a fragmentary enlarged section of FIG. 6.
Figure 12:
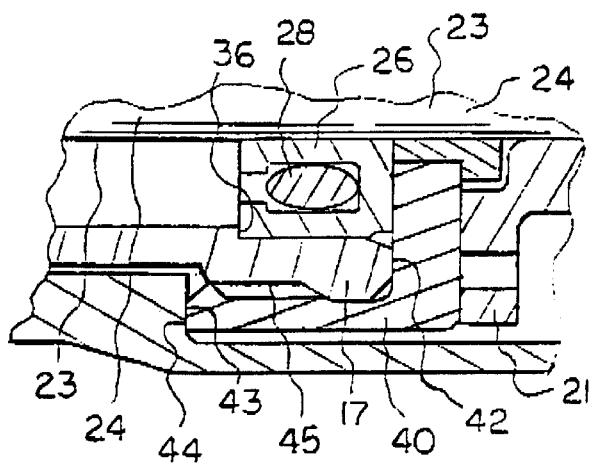
FIG. 12 is a fragmentary enlarged section of FIG. 11.

As noted above, there is a loose fit with clearance between the reduced portion 27 of shaft 23 and bore 32 in end cap 20, as depicted in FIG. 11. This clearance is desirable so that there will be practically no friction between portion 27 of shaft 24 and bore 32 of end cap 20, even if portion 27 of shaft 24 should hit the side of bore 32 when the shaft is in the position of FIG. 7. However, it is imperative that the tension-compression unit always return to the same position wherein the small end 27 of rod 24 is centered relative to the remainder of the end cap 20 to insure that the device 10 is always supported in the same position. In accordance with the present invention, the body 49 of clevis assembly 32' includes a protrusion in the form of an annular ridge 50 (FIGS. 7 and 9) which seats in complementary mating engagement in a depression in the form of an annular groove 51 in end cap 20, thereby assuring perfect centering of the small portion 27 of shaft 23 within sleeve 14.

Figure 8:
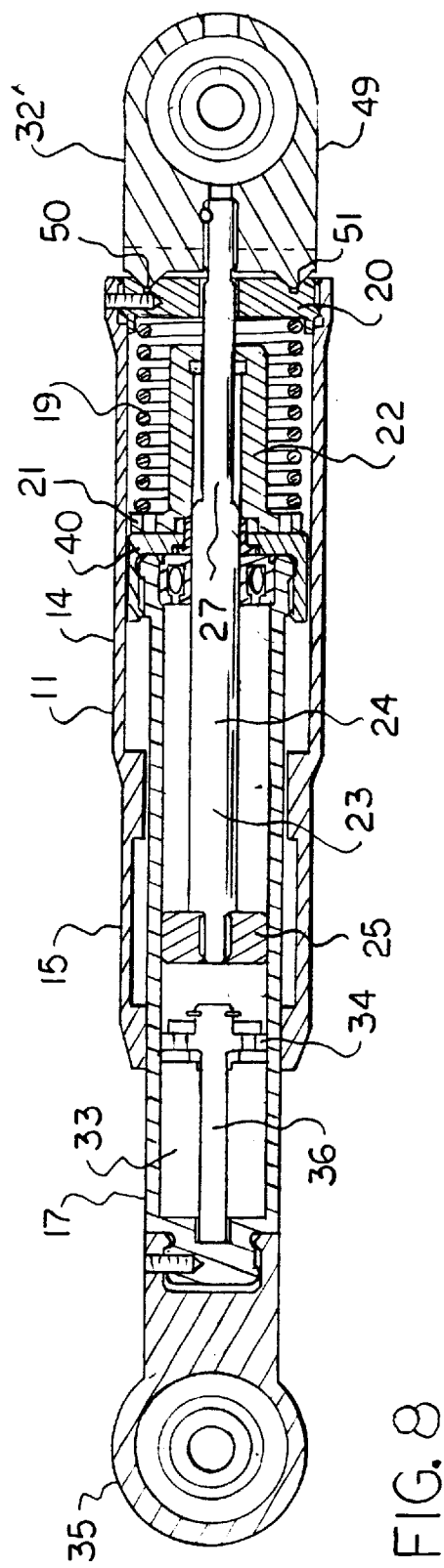
FIG. 8 is a cross sectional view of the tension-compression unit when it is subjected to compression.

When the tension-compression unit 11 is placed in compression, the parts will assume the positions of FIG. 8 wherein spring 19 is compressed between end cap 20 and portion 21 of member 20. In this respect, the right end of spring 19 will bear against end cap 20, and the left end of spring 19 will bear against portion 21 of member 22 which in turn will bear against member 40 which is threaded onto cylinder 17, and the parts of shaft 23 and head 25 will assume the positions shown in FIG. 8. When the compressive force is released, the parts will return to the position of FIG. 6 when spring 19 expands to the position of FIG. 6.

In the above-described system the springs have to be preloaded to the extent that the supported device does not move relative to the supporting surface in response to forces which may normally be experienced on a routine basis. This preloading maintains the spring units in their normal midstroke unstressed positions of FIG. 6. The total spring force produced by the tension-compression units can normally be between about three and four times the load. However, there are installations where the total spring force can be as low as 2.5 times the load or as high as ten times the load, but most of the time the spring force would be as low as about three times the load but it could be as high as about six times the load. The load would be the weight of the device including the member or platform above the tension-compression units on which the device rests.

Therefore, for example, if the load is ten pounds and the desired spring force is three times the load, the total spring force should be thirty pounds, and where the spring force is four times the load, the spring force would be 40 pounds. Therefore, on the basis of the foregoing, the ratio of total spring force to weight of the load can be between about 3:1, or it can be 4:1. By way of example and not of limitation, a system wherein the load is ten pounds and a 3–4G system preload is desired, the required preload can be 3×10 (30 pounds minimum), or it can be 4×10 (forty pounds maximum).

When six tension-compression units are at a 45° mounting angle between the supporting surface and the load, the required spring preload for each tension-compression unit or strut will be:

$$\text{Ratio 3:1 for ten pound load} = \frac{30}{6\sin 45°} = 7.1 \text{ pounds}$$

$$\text{Ratio 4:1 for ten pound load} = \frac{40}{6\sin 45°} = 9.5 \text{ pounds}$$

In the above equations, sin 45° is 0.7. Also, as noted above, the shaft clearance at bore 32 should be a few thousandths of an inch, preferably about ten thousandths of an inch.

As noted above, the total spring force can be as low as 2.5 times the load or as high as ten times the load, depending on the type of installation. Thus, there is a range where the ratio of spring force to load can be as low as 2.5:1 or as high as 10:1.

Also as noted above, the range of spring force to load in many instances can be as low as about three times the load or as high as six times the load, depending on the type of installation. Thus, there can be a range wherein the ratio of spring force to load can be as low as 3:1 or as high as 6:1. However, as noted above, the ratio of spring force to load would normally be between about 3:1 to 4:1.

While the above tension-compression unit utilized a protrusion in the form of a circular ridge 50 associated with a depression in the form of a circular groove 51 to center the shaft portion 27 in bore 32, it will be appreciated that any other type of centering structure can be used including but not limited to one or more conical protrusions on body 49 or end cap 20 and a complementary mating depression on the other of body 49 and end cap 20, or any other interfitting structure which causes the body 49 to return to a predetermined orientation relative to end cap 20.

It is to be noted that the tension-compression unit 11 itself is extremely similar to a prior art device, and the only substantial difference resides in the self-centering construction resulting from the coaction of the ridge 50 and groove 51, as explained above. Also, the prior art device did not have a clearance between the shaft and the end cap of the unit.

While a preferred embodiment of the present invention has been disclosed, it will be appreciated that it is not limited thereto, but may be otherwise embodied within the scope of the following claims.

What is claimed is:

1. In a shock-isolation structure wherein a load is supported on a supporting surface with a plurality of spring units operable in both tension and compression therebetween and wherein said spring units are oriented in a truss configuration with first ends of said spring units connected to said supporting surface for universal movement and with second ends of said spring units connected to said load for universal movement, the improvement wherein said plurality of said spring units each includes a sleeve, a coil spring in said sleeve, an end cap on said sleeve, a rod which extends outwardly through said end cap with a clearance fit in a nonextended position, a body on the end of said rod, and a depression and protrusion relationship between said end cap and said body for mating engagement therebetween when said rod is in said nonextended position to thereby center said rod in said end cap with said clearance therebetween, said protrusion being a ridge, and said depression being a groove which mates with said protrusion.

2. In a shock-isolation structure as set forth in claim 1 wherein the ratio of the total preload of all of the springs to the load is at least 3:1.

3. In a shock-isolation structure as set forth in claim 1 wherein the ratio of the total preload of all of the springs to the load is between about 3:1 and 4:1.

4. In a shock-isolation structure as set forth in claim 1 wherein the ratio of the total preload of all of the springs to the load is between about 3:1 and 6:1.

5. In a shock-isolation structure as set forth in claim 1 wherein the ratio of the total preload of all of the springs to the load is between about 2.5:1 and 10:1.

6. In a shock-isolation structure as set forth in claim 1 wherein said truss configuration comprises three pairs of spring units with each pair oriented in a V-configuration oriented 120° from each adjacent V-configuration.

7. In a shock-isolation structure as set forth in claim 6 wherein the ratio of the total preload of all of the springs to the load is at least 3:1.

8. In a shock-isolation structure as set forth in claim 6 wherein the ratio of the total preload of all of the springs to the load is between about 3:1 and 4:1.

9. In a shock-isolation structure as set forth in claim 6 wherein the ratio of the total preload of all of the springs to the load is between about 3:1 and 6:1.

10. In a shock-isolation structure as set forth in claim 6 wherein the ratio of the total preload of all of the springs to the load is between about 2.5:1 and 10:1.

11. In a shock-isolation structure as set forth in claim 6 wherein said first ends lie on a first perimeter and said second ends lie on a second perimeter which is smaller than said first perimeter.

12. In a shock-isolation structure as set forth in claim 11 wherein the ratio of the total preload of all of the springs to the load is at least 3:1.

13. In a shock-isolation structure as set forth in claim 11 wherein the ratio of the total preload of all of the springs to the load is between about 3:1 and 4:1.

14. In a shock-isolation structure as set forth in claim 11 wherein the ratio of the total preload of all of the springs to the load is between about 3:1 and 6:1.

15. In a shock-isolation structure as set forth in claim 11 wherein the ratio of the total preload of all of the springs to the load is between about 2.5:1 and 10:1.

16. In a shock-isolation structure as set forth in claim 11 wherein said first and second ends are connected to said supporting surface and said device, respectively, by ball joints.

17. In a shock-isolation structure as set forth in claim 16 wherein the ratio of the total preload of all of the springs to the load is at least 3:1.

18. In a shock-isolation structure as set forth in claim 16 wherein the ratio of the total preload of all of the springs to the load is between about 3:1 and 4:1.

19. In a shock-isolation structure as set forth in claim 16 wherein the ratio of the total preload of all of the springs to the load is between about 3:1 and 6:1.

20. In a shock-isolation structure as set forth in claim 16 wherein the ratio of the total preload of all of the springs to the load is between about 2.5:1 and 10:1.

21. In a shock-isolation structure as set forth in claim 1 wherein said first ends lie on a first perimeter and said second ends lie on a second perimeter which is smaller than said first perimeter.

22. In a shock-isolation structure as set forth in claim 21 wherein the ratio of the total preload of all of the springs to the load is at least 3:1.

23. In a shock-isolation structure as set forth in claim 21 wherein the ratio of the total preload of all of the springs to the load is between about 3:1 and 4:1.

24. In a shock-isolation structure as set forth in claim 21 wherein the ratio of the total preload of all of the springs to the load is between about 3:1 and 6:1.

25. In a shock-isolation structure as set forth in claim 21 wherein the ratio of the total preload of all of the springs to the load is between about 2.5:1 and 10:1.

26. In a shock-isolation structure as set forth in claim 21 wherein said first and second ends are connected to said supporting surface and said device, respectively, by ball joints.

27. In a shock-isolation structure as set forth in claim 26 wherein the ratio of the total preload of all of the springs to the load is at least 3:1.

28. In a shock-isolation structure as set forth in claim 26 wherein the ratio of the total preload of all of the springs to the load is between about 3:1 and 4:1.

29. In a shock-isolation structure as set forth in claim 26 wherein the ratio of the total preload of all of the springs to the load is between about 3:1 and 6:1.

30. In a shock-isolation structure as set forth in claim 26 wherein the ratio of the total preload of all of the springs to the load is between about 2.5:1 and 10:1.

31. In a shock-isolation structure as set forth in claim 1 wherein said protrusion and said depression are both circular.

* * * * *